Sept. 25, 1962     B. L. SHACKELFORD     3,055,711
AUTOMATICALLY OPERATING TAIL GATE LATCH
FOR TILTING DUMP TRUCKS
Filed March 6, 1959                    2 Sheets-Sheet 1
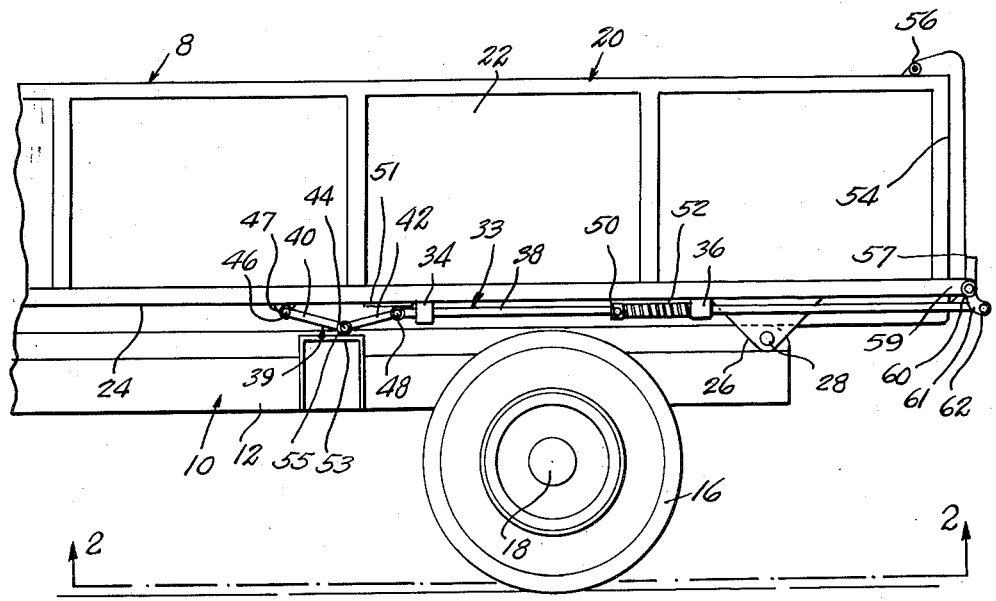
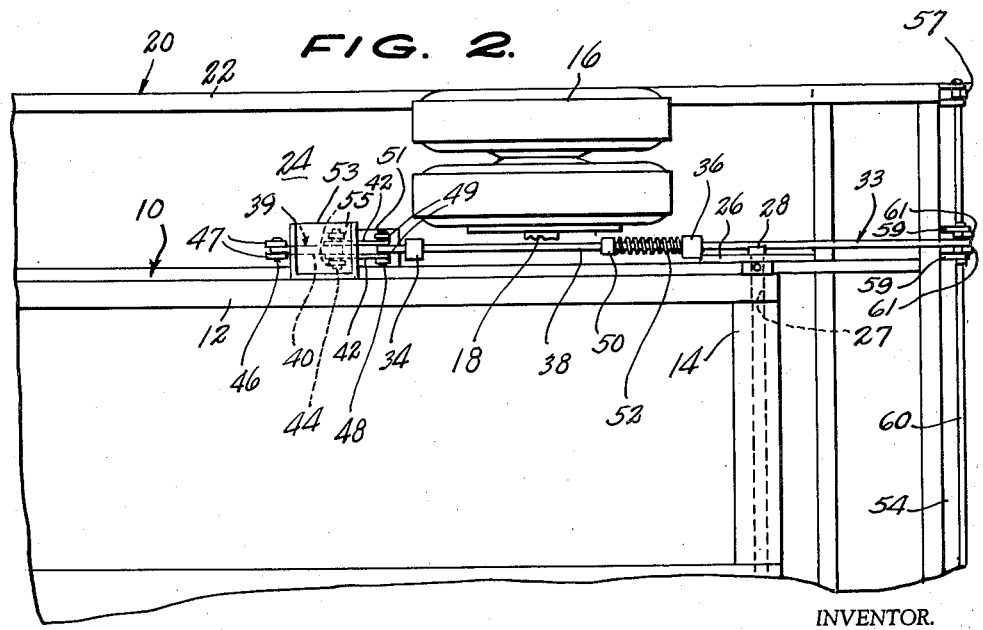
INVENTOR.
BYRD L. SHACKELFORD,
BY
McMorrow, Berman & Davidson
ATTORNEYS.

INVENTOR.
BYRD L. SHACKELFORD,
BY
McMorrow, Berman & Davidson
ATTORNEYS.

United States Patent Office 3,055,711
Patented Sept. 25, 1962

3,055,711
AUTOMATICALLY OPERATING TAIL GATE LATCH FOR TILTING DUMP TRUCKS
Byrd L. Shackelford, Closplint, Ky.
Filed Mar. 6, 1959, Ser. No. 797,649
6 Claims. (Cl. 298—23)

This invention relates to a novel tail gate latch for dump trucks.

The main object of the present invention is to provide an improved tail gate latch. It is proposed, in this regard, to provide for automatic latching of the tail gate responsive to lowering of the dump body to its normal, horizontal position.

A further object is to provide an automatically operating tail gate latch which will have automatic operation in opening of the tail gate, responsive to lifting of the dump body.

A further object is to delay automatic latching of the tail gate in closed position until the tail gate has had time to swing, of its own accord, fully to its closed position as the dump body nears its lowered position.

A further object is to provide a particularly strong latch, which will effect locking of a tail gate in its closed position at a plurality of locations over the full width of the dump body.

Another object is to provide an automatically operating tail gate latch of the character stated which will be particularly efficient in operation.

A further object is to simplify construction of the tail gate latch, to permit its manufacture at low cost and to reduce the possibility of malfunctioning.

A further object is to permit mounting of the tail latch on conventional dump bodies that are already in use without requiring modification or redesign of said bodies.

Another object is to permit swift and easy installation of the device.

A further object is to effect mounting of the entire operating linkage of the device on the underside of the dump body well inwardly from the sides thereof, out of the way of materials being dumped.

Other objects will appear from the following description, the claims appended thereto, and from the annexed drawings, in which like reference characters designate like parts throughout the several views, and wherein:

FIGURE 1 is a side elevational view of the rear portion of a dump truck, with the dump body lowered and the tail gate latched;

FIGURE 2 is a fragmentary bottom plan view of said dump truck, as seen from viewing line 2—2 of FIGURE 1, with the tail gate in latched position;

Figure 3:
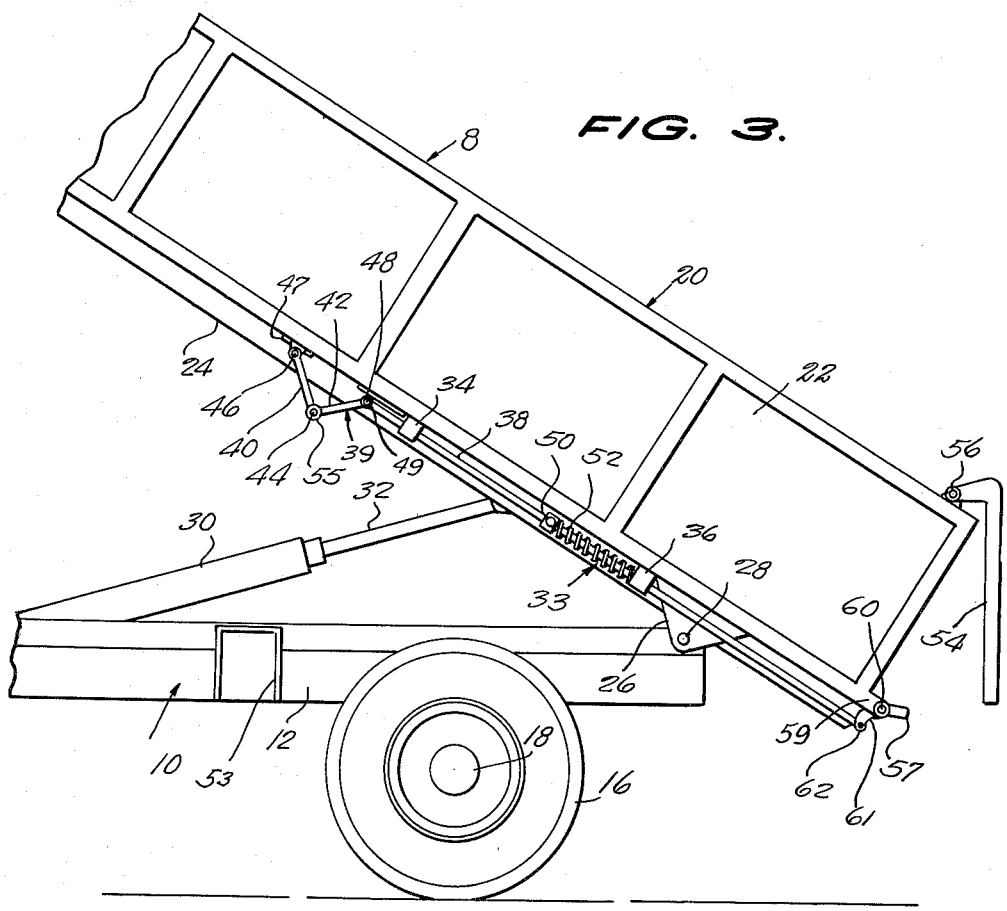
FIGURE 3 is a view like FIGURE 1 in which the dump body has been raised and the latch has been released.

In the drawings, there has been shown a conventional dump truck 8 having a chassis or frame 10, having longitudinally extending frame side members 12. Fixedly connected to the rear ends of and extending between the side frame members 12 is a rear cross member 14 (FIGURE 2). The rear truck wheels have been designated 16, and are carried by axle 18.

Generally designated at 20 is a dump body including side walls 22 and a bed 24. Rigid with and extending downwardly from the respective sides of the dump body, at a point near the rear end thereof, are plates 26, having transversely-aligned openings registered with transversely-aligned openings 27 provided in the side members 12 at the rear end of the frame. A hinge pin 28 extends through the registered openings of the plates 26 and frame side members, so that the dump body is tiltably mounted on the rear end of the frame 10, to tilt upwardly between a normal lowered horizontal position on the frame 10, as shown in FIGURE 1, and a rearwardly-declining dumping position, shown in FIGURE 3.

To elevate and lower the dump body there is provided a hydraulic cylinder 30 which is pivoted to the body 20 and the frame 10, a piston in the cylinder having a rod 32 which is pivoted to the underside of the dump body.

The illustrated latch device of the present invention, generally designated 33, comprises, as shown in FIGURES 1 and 2, forward and rear spaced guide sleeves 34 and 36, which are fixed to the underside of the body bed 24 along one side thereof. The sleeves 34 and 36 are spaced and axially aligned with each other on a line near to and spaced from the adjacent side member 12 of the frame 10.

Longitudinally slidable in the sleeves is a push rod 38. At its front end, the push rod is pivotally connected to a toggle, generally designated 39, which includes a front toggle link 40, FIGURE 2, and a pair of laterally-spaced rear toggle links 42. The front toggle link 40 is pivotally connected at its rear end to the forward ends of the rear links 42 by a pivot pin 44. The pivot pin 44 carries rollers 55. Link 40 at its front end is pivotally connected by pin 46 to depending ears or brackets 47 welded or otherwise fixedly secured to the underside of the dump body. The rear links 42 at their rear ends are pivotally connected by a piovt pin 48 to the front end of the push rod 38.

A wear plate 51 is fixedly secured to the bottom surface of the dump body with which rollers 49, journaled on the pivot pin 48, are rollably engaged.

A compression coil spring 52 is circumposed about the push rod, and is compressed between an adjustable collar 50 secured to the rod 38, and the rear end of the sleeve 36. Collar 50 can be adjusted longitudinally of the rod to adjust the tension of the spring 52.

A pressure plate 53, of inverted U-shaped right-triangular form, when seen in rear elevation (see FIGURE 4), is welded to or otherwise fixedly attached to the side surface of the adjacent longitudinal frame member 12. The pressure plate also includes a horizontal top portion projecting laterally outwardly from the frame to provide the above-referred to horizontal surface against which the pressure rollers 55, journaled on the pivot pin 44 connecting the toggle links 40 and 42, are adapted to bear when the dump body is lowered from an uptilted position.

At 54 there has been designated a conventional tail gate on the rear end of the body 20 which has on its upper end forwardly-projecting extensions which are pivoted on pins 56 to upper portions of the sides of the dump body. The tail gate can swing between closed and open positions, as shown in FIGURES 1 and 3, respectively. The tail gate swings about the pins 56, and when in open position has its lower end spaced outwardly from the bottom of the dump body. This permits the material in the dump body to freely gravitate through the open rear end thereof.

Figure 4:
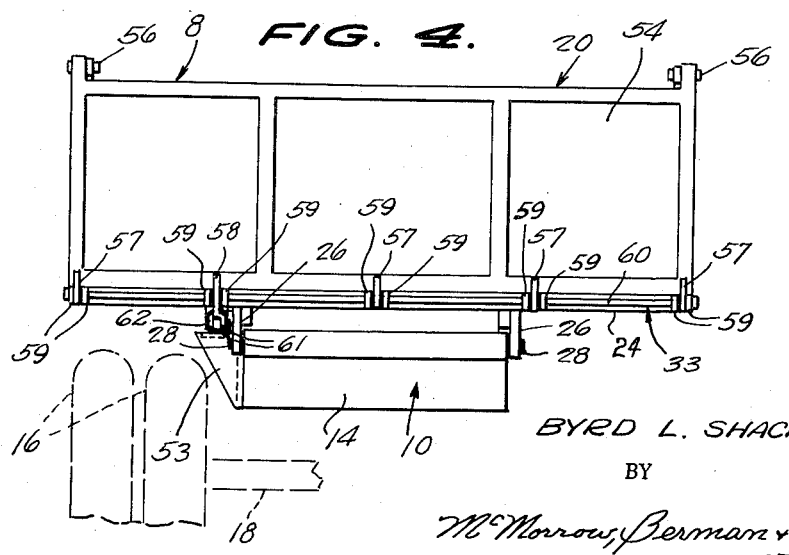
FIGURE 4 is a rear elevational view of the dump body and of the supporting chassis, the wheels of the truck being shown fragmentarily and in dotted lines.

Referring to FIGURES 3 and 4, a plurality of identical latch elements 57 are spaced crosswise of the rear end of the dump body 20, and are located inwardly of a main latch element 58. Secured to and projecting rearwardly from the rear end of the bed of the dump body are pairs of brackets 59, through which a transverse rock shaft 60 is journaled and on which are fixed the main latch element 58 and secondary latch elements 57.

The rock shaft 60, thus, when rotated in one direction, swings the several latch elements to the downwardly and rearwardly swung, tail gate-releasing position, as shown in FIGURE 3. When the shaft 60 is rocked in the opposite direction, the latch elements are swung forwardly to an upright position against the rear side of the closed tail gate, as shown in FIGURE 1.

The main latch element 58 has a depending, bifurcated extension 61, to which the rear end of the operating rod 38 is loosely and pivotally connected by a pivot pin 62. It will be understood that at both ends of the rod 38, the pivotal connections of said rod to the latch element 58 and to the links 42 respectively are such as to permit straight line movement of the pivotal connections, despite the arcuate travel of the associated ends of the latch element and links.

In use of the device, normally the dump body appears as in FIGURE 1. In these circumstances, tail gate 54 is closed. Latch elements 57, 58 are in vertical positions, bearing firmly against the lower edge portion of the tail gate. The tail gate is thus latched in closed position.

The toggle 39 is substantially flattened out, that is, is in its open position as shown in FIGURE 1. In these circumstances, the pressure rollers 55 bear firmly against the pressure plate 53. Further, the pivot pin 44 is spaced only a comparatively short distance from the bed or bottom plate of the truck body.

Assuming now that the dump body is elevated to its FIGURE 3, dumping position, as the body swings upwardly the pressure rollers 55 will move upwardly out of engagement with the pressure plate 53. Partly by gravity and partly by expansion of spring 52, the toggle links will move into a more acute angle relative to each other. In other words, the toggle 39 will move toward a closed position from its open position shown in FIGURE 1. Connecting rod 38 is biased to the left in FIGURE 3 from its FIGURE 1 position. This causes the main latch element 58, having bifurcated extension 61, to swing clockwise in FIGURE 3 from its FIGURE 1 position. The upwardly projecting portions of the several latch elements thus move outwardly, clear of the tail gate.

Continued elevation of the dump body will cause the tail gate to swing outwardly from the dump body, that is, the tail gate tends to remain vertically positioned as in FIGURE 3. The material within the vehicle is thus permitted to gravitate through the now open rear end of the dump body.

When the material has been dumped, the hydraulic ram is operated to lower the dump body. Some dump bodies may be lowered by gravitational action, and of course, regardless of the manner in which the dump body is lowered, the invention will still operate.

As the dump body moves back towards its FIGURE 1 position, the tail gate swings back into its closed position. In this connection, the parts are so arranged that the tail gate is in its fully closed position, before the device is operated in a manner to swing the latch elements up into tail-gate-engaging position. In other words, as the truck body approaches its fully lowered position, the rollers or equivalent means shown at 55 are engaged by the pressure plate. This causes the toggle to move toward its FIGURE 1 position from its FIGURE 3 position. Rod 38 is thus shifted to the right from its FIGURE 3 position. This in turn causes movement of the latch elements, responsive to rocking of shaft 60 in a counterclockwise direction in FIGURES 1 and 3 to their tail-gate-engaging position. The tail gate, meanwhile, would have moved over the outwardly swung latch elements, in position ready to be engaged by said elements. When the elements move to their FIGURE 1 position responsive to complete lowering of the dump body, the tail gate will be fully latched.

The device, thus, automatically operates to either latch or unlatch the tail gate. The operation, further, is responsive to the raising and lowering of the dump body. Still further, the device is so designed that it is adapted for installation on trucks already in use. In practice, it has been found that the device operates with full efficiency, and is characterized by its simple construction, ease of installation, adaptability for mounting on conventional dump bodies, and by its trouble-free operation resulting from its basic simplicity in both construction and operation.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In combination, a horizontal vehicle chassis frame having a rear end, a tiltable dump body having a bed, sides and an open rear end, said body overlying the chassis frame and having a rear end located at the rear end of the chassis frame, means mounting the body on the rear end of the frame to tilt on a transverse axis from a horizontal position resting upon the frame to an upwardly and rearwardly tilted dumping position, a pendant tail gate pivoted at its upper end on the sides of the body to occupy a closed position across the rear end of the body in the horizontal position of the dump body and an open position in the tilted position of the dump body, means for tilting and depressing the dump body, a transverse rock shaft journaled on the body at the rear end thereof, upstanding latch means fixed on the rock shaft to retainably engage the rearward side of the tail gate in the closed position of the tail gate, an endwise movable longitudinal push rod slidably mounted on the dump body bed at a side of the body, said rod having a rear end, a fixed depending lever on said rock shaft to which the rear end of the rod is operatively connected, spring means acting between a part of the body bed and said push rod yieldably urging said push rod rearwardly to rotate the rock shaft in a direction to move the latch means rearwardly and downwardly out of the path of the tail gate, said push rod having a forward end, a fixed pressure plate mounted on the chassis frame near to and forwardly of the forward end of the push rod, a toggle comprising a forward link having a forward end pivoted to the dump body bed, a rear link having a rear end pivoted to the forward end of the push rod, said toggle links being in mutually downwardly divergent relationship, said toggle links having respective rear and forward ends pivoted together and located over the pressure plate, the said pivoted ends of the toggle links being engageable with the pressure plate as the dump body subsides from a tilted position to a horizontal position so as to spread the toggle links away from each other and move the push rod rearwardly, against the resistance of the spring means, and move the latch means upwardly and forwardly into engagement with the rearward side of the tail gate for retaining the tail gate in its closed position.

2. The combination according to claim 1 wherein said latch means comprises a main latch element of which said depending lever is a part, and secondary latch elements spaced along the rock shaft.

3. The combination according to claim 1 wherein said pressure plate comprises a bracket mounted on the chassis frame and has a flat horizontal upper surface upon which the toggle links operatively engage.

4. The combination according to claim 3 wherein said bracket extends laterally from the frame.

5. The combination according to claim 1 wherein said pressure plate comprises a bracket mounted on the chassis frame and has a flat horizontal upper surface upon which the toggle links operatively engage, a pivot pin pivoting the toggle links together, and enlarged diameter rollers on said pivot pin for rolling contact with the upper surface of the pressure plate bracket.

6. The combination according to claim 5 which includes in addition a second pivot pin pivoting the rear toggle lever to the forward end of the push rod, and second enlarged diameter rollers on said second pivot pin, and a wear plate on the underside of the dump body bed against which the second rollers bear.

References Cited in the file of this patent

UNITED STATES PATENTS

| | | |
|---|---|---|
| 1,935,974 | Burner | Nov. 21, 1933 |
| 2,160,303 | Card | May 30, 1939 |
| 2,635,919 | Watson | Apr. 21, 1953 |
| 2,675,268 | Hutchinson | Apr. 13, 1954 |
| 2,767,017 | Enriquez | Oct. 16, 1956 |

FOREIGN PATENTS

| | | |
|---|---|---|
| 143,979 | Australia | Oct. 26, 1951 |
| 190,739 | Germany | Oct. 1, 1907 |